F. N. BOSSON & L. B. ARMSTRONG.
SHOCK ABSORBER FOR BATTERIES.
APPLICATION FILED AUG. 20, 1915.
1,224,439.
Patented May 1, 1917.
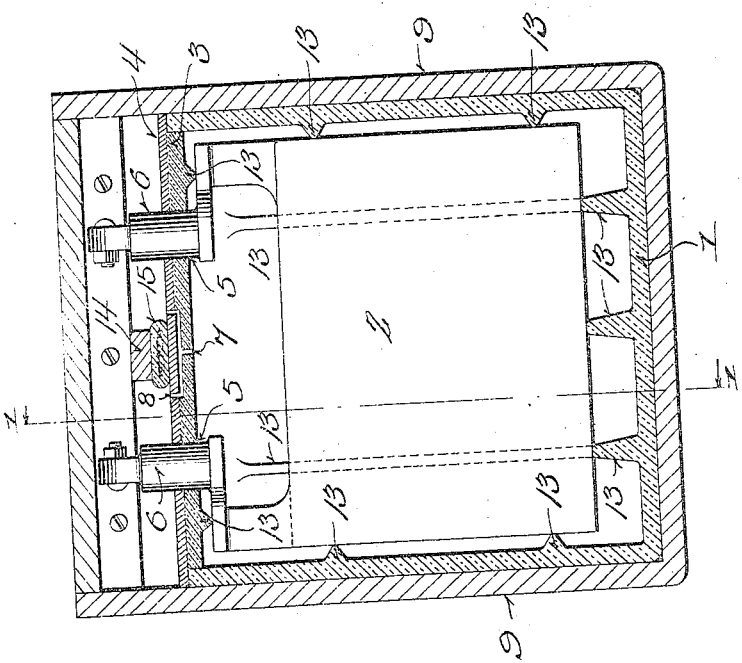
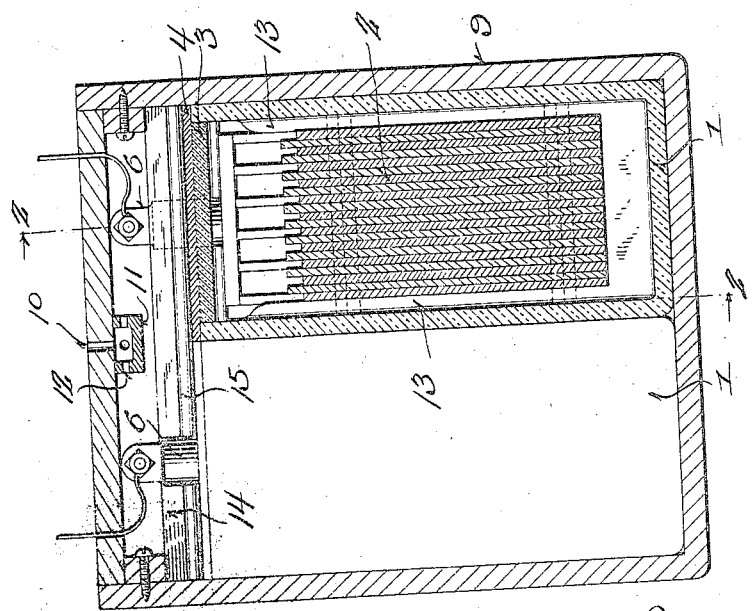

UNITED STATES PATENT OFFICE.

FREDERICK N. BOSSON, OF CALUMET, MICHIGAN, AND LYSANDER B. ARMSTRONG, OF MILWAUKEE, WISCONSIN.

SHOCK-ABSORBER FOR BATTERIES.

1,224,439.

Specification of Letters Patent. Patented May 1, 1917.

Application filed August 20, 1915. Serial No. 46,576.

*To all whom it may concern:*

Be it known that we, FREDERICK N. BOSSON and LYSANDER B. ARMSTRONG, both citizens of the United States, and residents of Calumet, in the county of Houghton and State of Michigan, and of Milwaukee, in the county of Milwaukee and State of Wisconsin, respectively, have invented certain new and useful Improvements in Shock-Absorbers for Batteries; and we do hereby declare that the following is a full, clear, and exact description thereof.

This invention relates to the subject of storage and other batteries, and more particularly to the type of batteries that are used in connection with motor vehicles and the like wherein the batteries are constantly subjected to shocks and jars incidental to vibrations of the vehicle, and the primary aim of the invention is to produce a battery of the type generally stated in which all shocks and jars incidental to such vibrations will be prevented from reaching or extending to the active portions of the battery.

The invention contemplates in its general organization the provision of an inclosing and protecting casing for the active portions of the battery, the casing being formed of soft, yielding, and insulating material and inclosing the electrodes and other active portions of the battery in such a manner that a cushion is interposed between said battery elements and the receptacle so that all shocks, jars and the like transmitted to the receptacle are absorbed by said cushion.

One simple and practical embodiment of the invention is shown in the accompanying drawing, wherein—

Figure 1 is a central vertical sectional view taken on the line 1—1, Fig. 2.

Fig. 2 is a vertical sectional view taken on the line 2—2, Fig. 1.

Referring to the accompanying drawings by numerals, it will be seen that the present invention consists in the provision of jars 1 for the electrodes 2 of the battery, the jars being preferably two in number, one being provided for each set of electrodes. The jars 1 are formed of soft rubber, each being provided with a soft rubber cover 3 having a backing 4 of hard rubber. The covers 3 are provided with suitable openings 5 through which the electrode hangers 6 project, and centrally said covers are provided with a vent opening 7 having discharge branches 8 that extend through the backing 4 to permit the escape of gas. The top of the battery casing 9 is also provided with a vent opening; 10, the inlet of which is surrounded by a cage 11 provided with side openings 12.

The sides, bottom and cover of the jars 1 are provided with regularly spaced inwardly projecting ribs 13, also of soft rubber, said ribs bearing against the electrodes and the hanger portions thereof, as shown more clearly in Fig. 2 of the drawings.

The jars 1 are placed in the receptacle or casing 9 so that they seat on the bottom of said casing and abut the ends and side walls thereof, the arrangement being a compact one, and said jars being of soft rubber, it will be seen that all shocks, jars, and the like that may be transmitted to the casing 9 will be absorbed by said jars. The cover of the casing 9 has its inner surface provided with a supporting bar 14 having its lower surface provided with a cushioning strip 15 of soft rubber, and such serves as a clamp for engaging and holding the covers of the jars 1 in sealing relation to said jars.

From the foregoing it will be apparent that as the jars 1 completely inclose the electrodes of the batteries, said electrodes are thoroughly cushioned against shocks and jars at all points. It will also be apparent that while the use of the ribs 13 in some instances are advisable, the same may be omitted if desired and the jars, or the inner surfaces thereof engage the electrodes at all points.

Attention is also directed to the fact that by employing a series of soft rubber jars which are independent of each other and are nested in a container, that shock in all directions will be absorbed readily, and this desired effect is further increased for the reason that the juxtaposed intermediate walls of the separate cells will form a double thickness of material which will to a certain extent add strength to the assemblage and a shock against the outer wall of one cell will be gradually absorbed and interrupted across the series, due to the separate units.

We claim as our invention:—

1. A container for battery elements embodying a casing having a series of independently removable cellular units adapted to nest within the same and in contact with each other, each cellular unit comprising a rectangular soft rubber jar, the walls of which were adapted to serve as a cushion for shielding the battery elements from shock incidental to vibration or jar of the casing walls.

2. A jar for the active elements of storage and other batteries formed of soft rubber and adapted to serve as a cushion for shielding said active elements from shocks and jars, horizontal ribs on the inner faces of a pair of oppositely disposed walls and vertical ribs on the inner faces of the other walls, said ribs serving to procure a further cushioning of the active elements disposed in the jar and to assist in retaining the normal shape of the jar.

3. A jar for the active elements of storage batteries formed of soft rubber and adapted to serve as a cushion for shielding said elements from shock and jars, ribs on the inner faces of oppositely disposed vertical walls, and other ribs on the inner faces of the bottom walls, said ribs serving to procure a cushioning of the active elements disposed in the jars and to assist in retaining the normal shape of the jars.

In testimony that we claim the foregoing we have hereunto set our hands at Calumet, in the county of Houghton and State of Michigan, and at Milwaukee in the county of Milwaukee and State of Wisconsin, respectively, in the presence of two witnesses.

FREDK. N. BOSSON.
LYSANDER B. ARMSTRONG.

Witnesses:
GEO. W. YOUNG,
M. E. DOWNEY.